United States Patent Office 2,999,823
Patented Sept. 12, 1961

2,999,823
FOAMED ALKYD-POLYISOCYANATE PLASTICS
Bernard A. Dombrow, Teaneck, N.J., assignor to Nopco Chemical Company, Harrison, N.J., a corporation of New Jersey
No Drawing. Filed Sept. 22, 1955, Ser. No. 536,035
9 Claims. (Cl. 260—2.5)

This invention relates to cellular or porous materials. More particularly, the invention relates to foamed alkyd resin-polyisocyanate plastics, both rigid and flexible, and to the process for producing them.

In recent years interest in foamed plastic products has rapidly developed. For the most part, this can be attributed to the unique and distinctive properties and characteristics exhibited by these products. These properties and characteristics render foamed plastic products suitable for and adaptable to a very great number of uses.

Foamed plastics can be produced by reacting a polyisocyanate with an alkyd resin. The reaction is characterized, in part, by the evolution of carbon dioxide which expands the reacting mass. The entrapment of the carbon dioxide gas within the expanded mass provides the plastic products which are ultimately obtained with their distinctive porous or cellular structure. The phenomenon by which the reacting mass expands and entraps the evolved gas within its structure is referred to in the art, and will be referred to herein, as foaming.

To a very great extent, the properties and characteristics of foamed plastics are determined by the nature of the ingredients, and the proportions thereof, used in their production. Quite obviously, the most important factor contributing to the unique properties, and hence the utility, of a foamed product is the evolution of carbon dioxide in, and the resulting expansion of, the reaction mass. However, the nature of the foam produced in any particular instance will depend, to a certain extent, on the nature and proportions of the resin and the polyisocyanate which comprise the reaction mass. Thus, an alkyd resin-polyisocyanate system will set to a cellular mass which is either rigid or flexible depending on the nature and proportions of the ingredients used in its production. Furthermore, by means of variations in the formulations thereof, foamed plastics can be produced which will possess outstanding adhesive properties. This latter attribute renders foamed plastic products suitable for use as protective coverings. Moreover, by alterning the nature of the constituents used in their production, and the proportions thereof, the thermal resistance, water and oil resistance, density, etc. of foamed plastic masses can be varied to suit a contemplated or proposed use.

However, although great advances have been made in this field toward providing the market with completely satisfactory cellular plastic products, the foamed products of the prior art, and the processes by which those products have been produced, are not devoid of undesirable characteristics. Thus, as will appear more clearly hereinafter, in the production of cellular plastic products from alkyd resins and polyisocyanate compounds, the first stage in the process involves admixing the reactants in a suitable vessel usually at temperatures at or around room temperature. This mixing operation is designated to obtain a homogeneous reaction mixture. At this stage foaming has not yet commenced. Immediately prior to the time it commences to foam, the mixture is poured into the space or cavity in which the foamed plastic product is to be produced. The optimum moment to pour the mixture in any particular instance will depend upon the specific reaction mixture in use. In every instance however the mixture should be homogeneous prior to pouring. Delay in pouring may result in the mixture commencing to foam in the mixing vessel. It has been found that certain alkyd resin-polyisocyanate mixtures of the prior art are quite viscous in the pre-foaming stage of the process. As a result of its high viscosity the mixture can be poured in place only with difficulty. Since, of necessity, more time must be expended in pouring a high viscosity mixture than would be required in pouring a mixture of lesser viscosity, the mixture may commence to foam before there has been an opportunity to completely pour it in place. For obvious reasons, such premature foaming is undesirable.

Furthermore, the cells comprising the internal portion of many of the foamed plastic products of the prior art, particularly the cells of relatively large size foamed plastic blocks, are quite often charred and discolored. The tendency of certain of the foamed plastic products to char or discolor has been attributed to the relatively high temperatures which develop in or about the center of the foaming reaction mass. Reaction masses which develop such high temperatures are said, in the art, to have a high exotherm. Discoloration of the product detracts from its appearance and, hence, decreases its marketability. Far more important, however, is the fact that charred cells are, of necessity, weakened cells. Since the strength and durability of any particular product depends upon the integrity of its cell structure, charred cells materially decrease the strength of the entire cell structure and, hence, substantially limit the ultimate usefulness and effectiveness of the product.

Another unfortunate property of many of the prior art products is the complete lack of uniformity in the cell structure of the plastic masses. The cells which comprise many such products are non-uniform both in size and in shape. Quite obviously, the ability of any particular foamed plastic product to function, uniformly, under the various stresses and strains that it may encounter in its use is determined by the uniformity in the size and shape of the cells which comprise its cell structure. Lacking uniformity, certain prior art products are unable to withstand, uniformly, particular stresses and strains to which they were subjected.

The object of this invention is to provide novel, foamed alkyd resin-polyisocyanate plastics, both rigid and flexible, having unusual and outstanding properties.

A more particular object of the invention is to provide foamed alkyd resin-polyisocyanate plastics which do not exhibit certain of the undesirable properties which are characteristic of many of the foamed plastic products of the prior art.

It is a further object of the invention to provide foamed alkyd resin-polyisocyanate plastics which are composed of cells that are completely uniform both in size and in shape.

Another object of the invention is to provide foamed alkyd resin-polyisocyanate plastics, the production of which is characterized by a substantially free flowing, easily poured reaction mass having a relatively low exotherm.

Other objects of the invention will be obvious and will, in part, appear hereinafter.

It has been discovered that the above and other objects of the invention are accomplished when a polyisocyanate, a mixture of polyisocyanates or a polyisocyanate addition product is reacted, at atmospheric pressure with or without the application of external heat, with an alkyd resin of the type produced by reacting a polyhydric alcohol with commercial isosebacic acid.

The alkyd resins used in preparing the foamed plastic products of this invention are produced by reacting commercial isosebacic acid with any one, or any combination, of the polyhydric alcohols known in the art as suitable for use in the production of such resins. In producing the alkyd resin used in the practice of this invention, the polyhydric alcohol and isosebacic acid are employed in such proportions that the ratio of hydroxyl groups to carboxyl groups in the reaction mixture is within the range of from about 3 hydroxyls:1 carboxyl to 4 hydroxyls:5 carboxyls. Furthermore, the resins used in producing the foamed plastic products of the invention are suitably adjusted so that they have acid numbers within the range of from about 5 to about 80. The preferred products of the invention, however, are produced from isosebacic acid type-alkyd resins which have acid numbers of from about 10 to about 25, said resins also having been produced from a mixture of reactants in which the ratio of hydroxyl groups to carboxyl groups was from about 2 to about 1. Moreover, the isosebacic acid type-alkyd resins employed in the preferred embodiment of the invention have a water content of from about 0.1% to about 5.0% by weight. However, as will appear more clearly hereinafter, the resin, as it is produced, need not contain any water whatsoever.

In general, the alkyd resins employed in producing the foamed plastic products of this invention are, in their formulation and in their production, similar to the alkyd resins used in producing the foamed plastic products of the prior art. In fact, within the scope of this invention, isosebacic acid can be substituted in any of the various alkyd resin formulations of the prior art for the polybasic acid components employed therein. However, the plastic products produced from such isosebacic acid type alkyd resins, and the processes by which said plastics are produced will be found to differ in many respects from the prior art products and processes.

A commercial product known as isosebacic acid is used in producing the alkyd resins which are employed in the practice of this invention. This commercial product is not a pure chemical compound. Rather, it is a mixture comprised of various aliphatic, dicarboxylic acids, both straight and branched chain, containing ten carbon atoms. Commercial isosebacic acid is a product of U.S. Industrial Chemicals Co., New York, New York. It is comprised of about 72% to 80%, by weight, of $\alpha$-ethyl suberic acid, about 12% to 18% by weight of $\alpha,\alpha'$-diethyl adipic acid and about 6% to 10% of sebacic acid. However, it is to be understood that the invention disclosed herein is not restricted solely to the use of an alkyd resin produced from the precise commercial mixture heretofore described. Rather, alkyd resins, fully suitable for use in producing the foamed plastics of this invention, can be produced from any comparable or equivalent mixture of those or similar acids.

The alkyd resins employed within the scope of this invention are prepared by reacting isosebacic acid, either alone or in conjunction with other polybasic acids or similar ester forming compounds, with a polyhydric alcohol, or with a mixture thereof, by any of the various methods or procedures known in the art. Thus, suitable resins are produced by reacting a polyhydric alcohol, or a mixture thereof, with isosebacic acid, either alone or in combination with other polybasic acids known in the art as suitable for use in the production of alkyd resins, as, for example, adipic acid, sebacic acid, citric acid, lactic acid, phthalic acid, etc. or with an anhydride, such as, for example, phthalic anhydride, maleic anhydride, etc. Polyhydric alcohols which can be, and have been, employed in producing alkyd resins which are completely satisfactory for use include, among others, diethylene glycol, triethylene glycol, 1,4 butylene glycol, glycerol and trimethylol propane as well as mixtures thereof. Furthermore, the invention contemplates the use not only of unmodified alkyd resins but also the use of isosebacic acid type alkyd resins which are modified with oil or with other resins. The following are the formulations of some of the particular unmodified alkyd resins especially well suited for use in producing the foamed plastic products of the invention:

FORMULA A

| | Mols |
|---|---|
| Glycerol | 4 |
| Isosebacic acid | 2.5 |
| Phthalic anhydride | 0.5 |

FORMULA B

| | Mols |
|---|---|
| Glycerol | 2 |
| 1,4 butylene glycol | 1 |
| Isosebacic acid | 2 |

FORMULA C

| | Mols |
|---|---|
| Trimethylol propane | 4 |
| Isosebacic acid | 2.5 |
| Phthalic anhydride | 0.5 |

FORMULA D

| | Mols |
|---|---|
| Glycerol | 2 |
| Pentaerythritol | 0.5 |
| Phthalic anhydride | 1 |
| Isosebacic acid | 3 |

In the above instances, each resin was suitably adjusted before use so that its acid number was within the range of from about 5 to about 80 and its water content within the range of from about 0.1% by weight to about 5.0% by weight. The preferred foamed plastic products of the invention were produced using the alkyd resin represented by Formula C, supra, the resin having been adjusted prior to its use so that it had an acid number of about 20 and a water content of about 0.5% by weight.

In addition to the resins, the formulations of which have been set forth heretofore, other isosebacic acid type-alkyd resins may instead be employed, such as, for example, simple resins produced by reacting commercial isosebacic acid with glycerol, trimethylol propane, etc., in such molecular quantities that the ratio of hydroxyl groups to carboxyl groups is within the prescribed range. Furthermore, the so-called oil or resin modified alkyd resins, such as are produced by incorporating oleic acid, castor oil, linseed oil, etc., or resin copal, rosin, etc., into the isosebacic acid-polyhydric alcohol formulation used in producing the resin, can be employed.

In producing the cellular plastic products of this invention, the isosebacic acid type-alkyd resin is reacted with a compound, or a mixture thereof, containing more than one isocyanate group, as, for example, by reacting the resin with (1) a polyisocyanate, (2) a mixture of polyisocyanates, (3) a mixture containing a polyisocyanate, or blend of polyisocyanates, and one or more high molecular weight, thermoplastic film-forming resin additives, or, (4) a polyisocyanate addition product. In an alternate embodiment of the invention, the polyisocyanate compound can, if desired, be replaced by a polythiocyanate compound. The preferred plastic products of the invention are produced by reacting a resin of the type described herein with meta-toluene diisocyanate or with an addition product thereof. However, as will be readily apparent to those skilled in the art, other polyfunctional isocyanates, such as, diphenylmethane diisocyanate can be employed instead. Within the scope of this invention, the polyisocyanate reactant can be employed, if desired, as is. In addition, a mixture of various proportions of polyisocyanates can be used. Furthermore, this invention contemplates the use of polyisocyanate addition products, such as are produced by reacting the polyisocyanate with compounds having more than one functional groups or radicals, each of which groups or radicals contains at least one labile hydrogen atom capable of reacting with the polyisocyanate by addition polymerization. As examples of compounds containing such reactive functional groups and radicals, the following are mentioned: (1) polyfunctional aliphatic alcohols, such as, 2-methyl, 2,4-pentanediol; 1,4-hexanediol; 1,5-pentanediol; ethylene glycol; diethylene glycol; etc.: (2) polyfunctional phenols, such as, resorcinol; pyrocatechol; pyrogallol; etc.: (3) bifunctional metal soaps, such as; aluminum monostearate; aluminum monooleate; aluminum monopalmitate; bismuth monostearate; etc. Also fully suited for use are polyisocyanate addition products of the type produced by reacting polyisocyanates with polyfunctional aliphatic amino alcohols, polyfunctional aliphatic or aromatic amines or polyfunctional thioglycols. The polyisocyanate addition products contemplated for use by this particular embodiment of the invention are compositions such as are disclosed in U.S. Patent 2,602,783.

In producing the products of this invention the isosebacic acid type-alkyd resin can be reacted, if desired, with the polyisocyanate, or with the polyisocyanate mixture, in a reaction system which also contains any one or any combination of the various additive compositions whose use in such system is known in the art. These additives may, or may not, be reactive with the polyisocyanate. The additive compositions contemplated by this particular embodiment of the invention, include, among others, (1) metallic soaps, such as, zinc stearate; aluminum stearate; calcium stearate; zinc laurate; etc.: (2) metallic leafing powders, such as, aluminum leafing powder; aluminum bronze leafing powder; copper bronze leafing powder; lead leafing powder; etc.: and (3) mixtures thereof. U.S. Patent 2,577,280 discloses and claims the inclusion of a metallic soap in a diisocyanate-alkyd resin reaction mixture. The use of metallic soaps and metallic leafing powders in polyisocyanate-alkyd resin reaction mixtures is discussed in U.S. Patent 2,602,783. The quantity of metallic soap and/or metallic leafing powder employed in any particular formulation can be varied greatly. Ordinarily, from about 0.0625 part by weight to 7.5 parts by weight of either are used for each 30 parts by weight of resin present. When a combination of metallic soap and metallic leafing powder is used the quantity of each can vary within the range of from about 0.0625 part by weight to 5.0 parts by weight for each 30 parts by weight of resin present. Other additive compositions which can be incorporated into the alkyd resin-polyisocyanate reaction system include high molecular weight, thermoplastic, film-forming polymeric resin compositions such as are disclosed in U.S. Patent 2,591,844. This group of additive compositions serves to stabilize the foam during the reaction and includes ethyl cellulose, polymeric chlorinated natural rubber, polymeric vinyl chloride-vinyl acetate copolymers, polyvinyl chloride, polyvinyl acetate, polystyrene, polydichlorostyrene, polymeric acrylate and methacrylate resins and their co-polymers, and polyvinyl butyral. The nature of the additive employed in any particular instance will determine the quantity to be used. In general, a concentration of about 2 parts by weight of a high molecular weight, polymeric, thermoplastic resin additive composition for each 100 parts by weight of meta-toluene diisocyanate will produce noticeable results. In one particular embodiment of the invention, foamed plastic products having outstanding properties and characteristics are produced when metatoluene diisocyanate is reacted with an isosebacic acid type-alkyd resin of the type disclosed herein, in a system containing ethyl cellulose, the ratio of ethyl cellulose to the diisocyanate being from about 0.03 parts by weight to 15 parts by weight of ethyl cellulose for each 100 parts by weight of meta-toluene diisocyanate.

As has been disclosed heretofore, the alkyd resins preferably employed in producing the foamed plastic products of the invention have a water content within the range of from 0.1% to 5.0% by weight. However, the important consideration is not the presence of the small quantity of water in the resin itself. Rather, it is the presence of the water in the reaction system. It is well known in the art that, although foamed products can be obtained by the reaction of an alkyd resin and a polyisocyanate in the absence of water, the presence of small quantities of water in the reaction system contributes greatly to the production of plastic products of decreased density. The use of a water-containing alkyd resin is merely a simple expedient for insuring the presence of that quantity of water. Thus, since the manner in which water is incorporated into the reaction system is of no importance whatsoever to the operability of the invention its presence can be provided for in any one of several ways. As disclosed heretofore the resin to be used can be produced in such a manner that it will contain the quantity of water required by the system for completely satisfactory results. However, if desired, water can be incorporated, by suitable means, into the resin at some time prior to its use in producing the foamed plastic product. In addition, the required quantity of water can be incorporated into the reaction mixture in combination with a non-ionic wetting agent or by the use of one or more metallic salt hydrates in the manner disclosed in U.S. Patent 2,577,279. Effective non-ionic wetting agents include, among others, alkylatedphenoxy polyethoxy ethanols, polyoxyalkylene derivatives of hexitol anhydride partial long chain fatty acid esters and water-soluble hydroxylated resins. The metallic hydrate salts which are similarly effective include sodium acetate, manganous chloride, cupric nitrate, magnesium bromide, lithium salicylate and calcium chloride.

If desired, the foamed cellular plastic products of the invention may be made flame resistant and fire retardant by incorporating additives into the polyisocyanate-alkyd resin reaction mixtures which are suitable for imparting these characteristics to the foamed plastics. Such additive compositions are disclosed in U.S. Patent 2,602,783. They include (1) unsaturated alkyl esters of aryl phosphonic acids, such as, diallyl phenyl phosphonate, bis (methallyl) benzenephosphonate, diallyl toluene phosphonate; (2) trichloralkyl phosphates, such as, tri-$\beta$-chlorethyl phosphate, trichlorpropyl phosphate; and, (3) unsaturated alkyl esters of the alkenyl phosphonic acids, such as, diallyl isobutene phosphonate, diallyl styrene phosphonate, etc. In general, the alkyl esters of aryl phosphonic acids have been found effective for this purpose when from 1 to 20 parts by weight are used for each 30 parts by weight of alkyd resin present. Generally, however, completely satisfactory results are obtained when 5 parts by weight of such alkyl ester is present for each 30 parts by weight of resin present. The unsaturated alkyl esters of alkenyl phosphonic acids are employed in the proportion of from 1 to 20 parts by weight for each 30 parts by weight of the alkyd resin when used alone. The trichloralkyl phosphates are employed to impart the desired characteristics to the products in the proportion of from 0.5 part by weight to 10 parts by weight for each 30 parts by weight of the alkyd resin. When the trichloralkyl phosphate is used in conjunction with a quantity of unsaturated alkyl esters of aryl phosphonic acid which is within the limits prescribed herein, 0.5 part by weight to 7.5 parts by weight are used for each 30 parts by weight of alkyd resin present. Antimony oxide can also be incorporated into the foamed plastic-forming reaction mixture to impart flame-proofing and fire-retardant properties to the foamed product. Regardless of whether or not it is employed in conjunction with the unsaturated alkyl esters of aryl phosphonic acid or with the trichloralkyl phosphate, from 0.25 part by weight to 5 parts by weight of antimony oxide are used for each 30 parts by weight of alkyd resin present.

In producing the preferred products of this invention meta-toluene diisocyanate is the polyfunctional isocyanate used. Ordinarily, from about 35 to about 150 parts by weight of polyisocyanate are employed for each 100 parts by weight of alkyd resin present. Moreover, the polyisocyanate, for example, meta-toluene diisocyanate, is preferably employed in admixture with ethyl cellulose. In this particular embodiment of the invention, from about 0.03 to about 15 parts by weight of ethyl cellulose are employed for each 100 parts by weight of meta-toluene diisocyanate. The preferred concentration of ethyl cellulose used in the reaction mixture varies within the range of from about 0.5 part to 7 parts by weight of ethyl cellulose for each 100 parts by weight of meta-toluene diisocyanate present. Complete satisfactory results have been obtained using commercial grades of ethyl cellulose resins having an ethoxyl content of from about 43% to about 50% and a viscosity of from about 7 to about 200 centipoises, the viscosity of said resins being determined on a 5% by weight solution in a 60:40 toluene-ethanol solvent at 25° C. Preferably, the ethyl cellulose resins employed in producing the products of this invention will have an ethoxyl content within the range of from about 45.0% to about 49.5% and a viscosity of from about 50 to about 100 centipoises.

The foamed plastic products are produced by any of the processes, or variations thereof, which are known in the art. They can be produced either in the presence or in the absence of catalytic materials. In general, peroxide catalysts have been found to be most suitable for use. Moreover, the products can be produced in the presence of foam stabilizers other than those mentioned heretofore, such as, the quaternary ammonium bentonite complexes. In general, however, excellent results will be obtained by first commingling the reactants, until the mass is homogeneous, in a suitable vessel at atmospheric pressure, generally at room temperature. If desired, or if necessary, the reactants can be mixed at a temperature elevated somewhat above room temperature. Before foaming commences, the mixture is poured in place. The reaction, with its characteristic foaming, is then permitted to proceed to completion preferably at atmospheric pressure. Since the reaction is exothermic the application of external heat will not be required ordinarily to drive it to completion. When the reaction is completed, the cellular product produced can be post-cured, if desired, to obtain a stronger product which is more stable to heat and resistant to solvents. The post-curing operation is effectively carried out by heating the cellular product at a temperature of from about 130° F. to 300° F. for a period of from about 1 to about 20 hours. The actual conditions employed in post-curing a product will vary depending chiefly upon the nature of the particular product involved and upon the result sought to be achieved.

The foamed plastic products of the present invention overcome many of the undesirable features which detract from the usefulness and effectiveness of certain prior art products and the processes by which they are produced. Thus, for example, the reaction mixtures have relatively low viscosities and, hence, they are readily poured in place. Moreover, the internal portion of even relatively large size foamed plastic blocks produced in the practice of this invention do not discolor or char. In all probability, this is attributable to the fact that the polyisocyanate-isosebacic type-alkyd resin reaction mixture has an exotherm which is relatively low. Furthermore, by proceeding in accordance with the disclosure of the present invention, the foamed plastic products obtained have completely uniform cell structure through out. This uniformity in cell structure extends not only to the size of the cells but also to the shape thereof. The products of the present invention are superior to prior art products in still another respect since, for the most part, they are composed of cells which are relatively much smaller than those of the prior art products. Since the cells are uniform and are smaller than those normally found in the products of the prior art, the products of the present invention contain a proportionately greater number of cells than the prior art products.

While the present invention contemplates particularly the production of foamed plastic products of the rigid type, it should be understood that the invention is not limited solely to the production of such products. Flexible foamed plastic materials can also be produced using the novel isosebacic acid type-alkyd resins of my invention. Furthermore, while certain specific embodiments of the invention have been set forth fully herein, the invention is not restricted thereto since isosebacic acid type-alkyd resins can be employed in any of the many processes known in the art for the production of foamed plastic materials in place of the alkyd resins now used therein.

For a fuller understanding of the nature and objects of this invention reference may be had to the following example which is given merely as a further illustration of the invention and is not to be construed in a limiting sense. All parts are given by weight.

Example I

An alkyd resin was produced using the following named ingredients in the proportions designated:

| | Mols |
|---|---|
| Isosebacic acid | 2.5 |
| Phthalic anhydride | 0.5 |
| Trimethylol propane | 4.0 |

The resin was prepared by heating the ingredients in an inert atmosphere under pressure. The resin was adjusted so that it had an acid number of about 20 and a water content of about 0.5% by weight. The water content of the resin was thereafter raised to about 1% by weight. In its viscosity, this resin was to some extent less viscous than alkyd resins similarly produced using adipic acid rather than isosebacic acid as the polybasic acid component.

Subsequently, 55.5 parts of the resin and 45.5 parts of a mixture comprising 42.77 parts of meta toluene diisocyanate and 2.73 parts of ethyl cellulose (50 to 100 centipoises viscosity; ethoxyl content of from 45.0% to 49.5%) were commingled in a suitable vessel and mixed thoroughly. A fluid mixture was thus obtained. This mixture was substantially less viscous than a mixture of comparable quantities of meta-toluene diisocyanate and an adipic acid type-alkyd resin. When the mixture was homogeneous, it was quickly poured into a receptacle. Due to its relatively low viscosity, the mixture was easily poured. The mixture thereafter started to foam. The reaction was allowed to proceed to completion without the application of external heat. It was observed that the exotherm of the reaction mixture was much lower, for example, from 30° F. to 50° F. lower, than the exotherm of comparable polyisocyanate-adipic acid type alkyd resin reaction mixtures. Moreover, in the reaction system of the present example control over the density of the plastic product produced was more easily exercised than is normally possible when an adipic acid type-alkyd resin is present in the reaction mixture. When the reaction was complete, the foamed plastic mass was post-cured by heating it at a temperature of about 200° F. in the receptacle in which it was produced for a period of about two hours.

The foamed plastic product of this example was a rigid structure composed of an extremely large number of small cells which were uniform both in size and in shape. In this respect the product was superior to products produced by reacting meta-toluene diisocyanate with an adipic acid type-alkyd resin. Moreover, the product of this example was superior to foamed plastic products produced using an adipic acid type alkyd resin in the uniform manner in which the cells were distributed throughout the product. An examination of a cross section of this product revealed that the internal portion of the product neither discolored nor tended to discolor.

Having described my invention what I claim to be new and desire to secure by Letters Patent is:

1. A foamed cellular plastic material which is the reaction product of a mixture which comprises (a) an aromatic diisocyanate selected from the group consisting of meta-toluene diisocyanate and diphenyl-methane diisocyanate and (b) an alkyd resin having an acid number of from about 5 to about 80, said ingredients (a) and (b) being present in a ratio of from about 35 to about 150 parts by weight of (a) for each 100 parts by weight of (b), said ingredient (b) being the reaction product of a mixture comprising a polyhydric alcohol selected from the group consisting of diethylene glycol, triethylene glycol, 1,4 butylene glycol, glycerol, trimethylol propane, pentaerythritol and mixtures thereof and a blend of dibasic acids consisting essentially of about 72% to 80% by weight of α-ethyl suberic acid, about 12% to 18% by weight of α,α'-diethyl adipic acid and about 6% to 10% by weight of sebacic acid, in which polyhydric alcohol-dibasic acid mixture the hydroxyl groups and carboxyl groups are in the ratio of from 3(OH):1(COOH) to 4(OH):5(COOH).

2. A foamed cellular plastic material which is the reaction product of a mixture which comprises (a) an aromatic diisocyanate selected from the group consisting of meta-toluene diisocyanate and diphenylmethane diisocyanate and (b) an alkyd resin having an acid number of from about 5 to about 80, said ingredients (a) and (b) being present in a ratio of from about 35 to about 150 parts by weight of (a) for each 100 parts by weight of (b), said ingredient (b) being the reaction product of a mixture comprising a polyhydric alcohol selected from the group consisting of diethylene glycol, triethylene glycol, 1,4-butylene glycol, glycerol, trimethylol propane, pentaerythritol and mixtures thereof and a blend of dibasic acids consisting essentially of about 72% to 80% by weight of α-ethyl suberic acid, about 12% to 18% by weight of α,α'-diethyladipic acid and about 6% to 10% by weight of sebacic acid, in which polyhydric alcohol-dibasic acid mixture the hydroxyl groups and carboxyl groups are in the ratio of from 3(OH):1(COOH) to 4(OH):5(COOH), the reaction of (a) and (b) having been carried out in the presence of water, the quantity of water being from about 0.1% to about 5.0% by weight, based on the weight of said ingredient (b).

3. The composition of claim 2 wherein (b), the alkyd resin, has an acid number of from about 10 to about 25 and wherein the hydroxyl groups and carboxyl groups in the alkyd resin reaction mixture are in the ratio of from about 2(OH):1(COOH).

4. A foamed cellular plastic material which is the reaction product of a mixture which comprises (a) meta-toluene diisocyanate and (b) an alkyd resin having an acid number of from about 10 to about 25, said ingredients (a) and (b) being present in a ratio of from about 35 to 150 parts by weight of (a) for each 100 parts by weight of (b), said ingredient (b) being the reaction product of a mixture comprising a polyhydric alcohol selected from the group consisting of diethylene glycol, triethylene glycol, 1,4-butylene glycol, glycerol, trimethylol propane, pentaerythritol and mixtures thereof and a blend of dibasic acids consisting essentially of about 72% to 80% by weight of α-ethyl suberic acid, about 12% to 18% by weight of α,α'-diethyl adipic acid and about 6% to 10% by weight of sebacic acid, in which polyhydric alcohol dibasic acid mixture the hydroxyl groups and carboxyl groups are in the ratio of from about 2(OH):1(COOH), the reaction of (a) and (b) having been carried out in the presence of water, the quantity of water being from about 0.1% to 5.0% by weight, based on the weight of said ingredient (b).

5. The composition of claim 4 wherein the polyhydric alcohol constituent of the alkyd resin reaction mixture is trimethylol propane.

6. A foamed cellular plastic material which is the reaction product of a mixture which comprises (a) meta-toluene diisocyanate (b) an alkyd resin having an acid number of from about 10 to about 25, said ingredients (a) and (b) being present in a ratio of from about 35 to about 150 parts by weight of (a) for each 100 parts by weight of (b), said ingredient (b) being the reaction product of a mixture comprising a polyhydric alcohol selected from tht group consisting of diethylene glycol, triethylene glycol, 1,4-butylene glycol, glycerol, trimethylol propane, pentaerythritol and mixtures thereof and a blend of dibasic acids consisting essentially of about 72% to 80% by weight of α-ethyl suberic acid, about 12% to 18% by weight of α,α'-diethyl adipic acid and about 6% to 10% by weight of sebacic acid, in which polyhydric alcohol-polybasic acid mixture the hydroxyl groups and carboxyl groups are in the ratio of from about 2(OH):1(COOH), and (c) ethyl cellulose in a ratio of from about 0.03 part to about 15 parts by weight thereof for each 100 parts, by weight of (a), said (c) having an ethoxyl content of from about 43% to about 50% and a viscosity, as determined on a 5% by weight solution in a 60:40 toluene-ethanol solvent at 25° C., of from about 7 to about 200 centipoises, the said (b) having been reacted with the reaction product of (a) and (c) in the presence of water, the quantity of water being from about 0.1% to 5.0%, by weight, based on the weight of said (b).

7. The composition of claim 6 wherein the polyhydric alcohol constituent of the alkyd resin reaction mixture is trimethylol propane.

8. A foamed cellular plastic material which is the reaction product of (a) meta-toluene diisocyanate (b) an alkyd resin having an acid number of from about 5 to about 80 and a water content of from about 0.1% to about 5.0% by weight, prepared from 4 mols of trimethylol propane, 2.5 mols of a blend of dibasic acid consisting essentially of about 72% to 80% by weight of α-ethyl suberic acid, 12% to 18% by weight of α,α'-diethyl adipic acid and 6% to 10% by weight of sebacic acid, and 0.5 mol of phthalic anhydride, said ingredients (a) and (b) being present in a ratio of from about 35 to about 150 parts by weight of (a) for each 100 parts by weight of (b), and (c) ethyl cellulose in a ratio of from about 0.03 part to about 15 parts by weight thereof for each 100 parts by weight of (a), said (c) having an ethoxyl content of from about 43% to 50% and a viscosity as determined on a 5% by weight solution in a 60:40 toluene-ethanol solvent at 25° C. of from about 7 to about 200 centipoises.

9. A foamed cellular plastic material which is the reaction product of (a) meta-toluene diisocyanate, (b) an alkyd resin having an acid number of from about 10 to about 25 and a water content of from about 0.1% to about 5.0% by weight prepared from 4 mols of trimethylol propane, 2.5 mols of a blend of dibasic acids consisting essentially of about 72% to 80% by weight of α-ethyl suberic acid, about 12% to 18% by weight of α,α'-diethyl adipic acid and about 6% to 10% by weight of sebacic acid and 0.5 mol of phthalic anhydride, said ingredients (a) and (b) being present in a ratio of from about 35 to about 150 parts by weight of (a) for each 100 parts by weight of (b), and, (c) ethyl cellulose being present in a ratio of from about 0.5 part to about 7.0 parts by weight thereof for each 100 parts by weight of (a), said (c) having an ethoxyl content of from about 45.0% to about 49.5% and a viscosity, as determined on a 5% by weight solution in a 60:40 toluene-ethanol solvent at 25° C., of from about 50 to about 100 centipoises.

References Cited in the file of this patent

UNITED STATES PATENTS

| | | |
|---|---|---|
| 2,591,884 | Simon et al. | Apr. 8, 1952 |
| 2,642,403 | Simen et al. | June 16, 1953 |